United States Patent [19]

Kopczynski

[11] Patent Number: 4,969,530
[45] Date of Patent: Nov. 13, 1990

[54] ALL-TERRAIN VEHICLE

[76] Inventor: John F. Kopczynski, 1671 Sweeney St., North Tonawanda, N.Y. 14120

[21] Appl. No.: 426,217

[22] Filed: Oct. 25, 1989

Related U.S. Application Data

[62] Division of Ser. No. 319,127, Jul. 3, 1989, Pat. No. 4,941,539.

[51] Int. Cl.$^5$ ............................................. B62D 61/10
[52] U.S. Cl. .............................. 180/24.09; 180/24.05; 475/225; 475/231
[58] Field of Search .................... 180/24.09, 24.05; 70/710, 713

[56] References Cited

U.S. PATENT DOCUMENTS

| | | | |
|---|---|---|---|
| 2,256,570 | 9/1941 | Kopczynski | 180/7.1 |
| 2,642,144 | 6/1953 | Brewer | 180/24.06 |
| 2,683,495 | 7/1954 | Kopczynski | 180/7.1 |
| 2,711,221 | 6/1955 | Kopczynski | 180/24.05 |
| 2,716,358 | 8/1955 | Pool et al. | 74/710 |
| 2,786,540 | 3/1957 | Sfredda | 180/24.08 |
| 2,790,503 | 4/1957 | Kopczynski | 180/70.01 |
| 2,819,767 | 1/1958 | Kopczynski | 180/7.1 |
| 3,204,713 | 9/1965 | Shanahan et al. | 114/270 |
| 3,315,977 | 4/1967 | Small | 280/677 |
| 3,351,037 | 11/1967 | Meili | 114/270 |
| 3,397,896 | 8/1968 | Willetts | 280/677 |
| 3,495,672 | 2/1970 | Barr | 180/48 |
| 3,506,079 | 4/1970 | Madler et al. | 180/24.08 |
| 3,756,619 | 9/1973 | Thorsell | 280/104 |
| 3,809,004 | 5/1974 | Leonheart | 114/270 |
| 4,359,116 | 11/1982 | Mankey | 180/6.48 |

FOREIGN PATENT DOCUMENTS

| | | | |
|---|---|---|---|
| 515376 | 3/1921 | France | 280/24.09 |
| 47739 | 6/1937 | France | 280/24.09 |
| 359322 | 3/1938 | Italy | 180/24.08 |
| 305340 | 2/1929 | United Kingdom | 280/24.09 |

Primary Examiner—Kenneth R. Rice
Attorney, Agent, or Firm—Joseph P. Gastel

[57] ABSTRACT

An all-terrain vehicle having two bogies movably joined at their inner ends and pivotally mounted on each side of the vehicle and two main wheels mounted on the ends of one of the bogies and a third wheel mounted on the other end of the other bogie. The outer ends of the bogies extend beyond the vehicle body and have auxiliary wheels mounted on such outer ends on the opposite sides of the bogies from the main wheels. A gear drive is provided for driving each of the auxiliary wheels at the same peripheral speed as the main wheels. The vehicle can also have a limited travel differential for permitting limited relative rotational motion between wheels on opposite sides of the differential but supplying a positive drive thereto at the end of such limited travel. The vehicle can also have a torsion bar drive or a limited travel torsion bar drive between the various bogie-mounted wheels to thereby permit relative rotational movement therebetween while still providing positive drives thereto. A double-bogie vehicle is also disclosed, as described above, which has spring-shock struts suspending the wheels between the vehicle body and the bogies. A bogie suspension is also disclosed wherein one or more of the independently spring-shock mounted wheels has a drive and/or a steering linkage attached thereto.

9 Claims, 9 Drawing Sheets

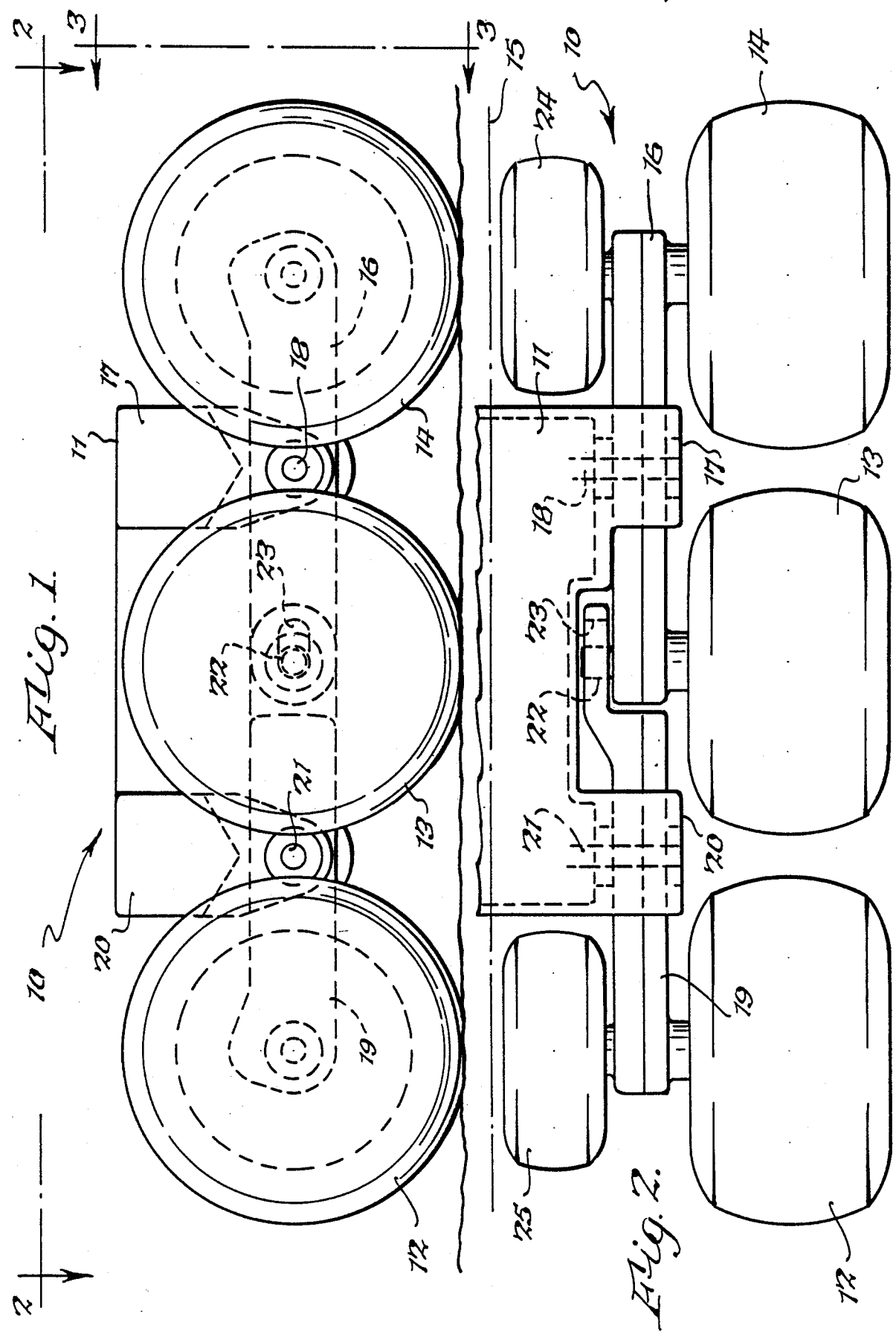

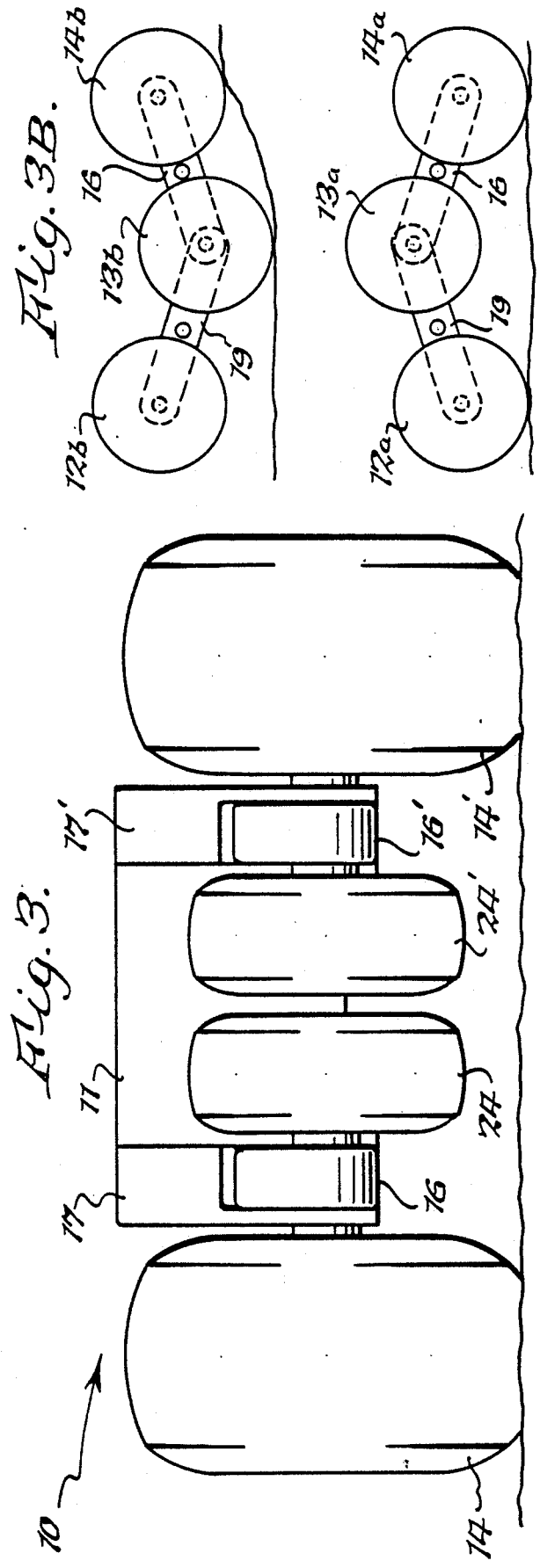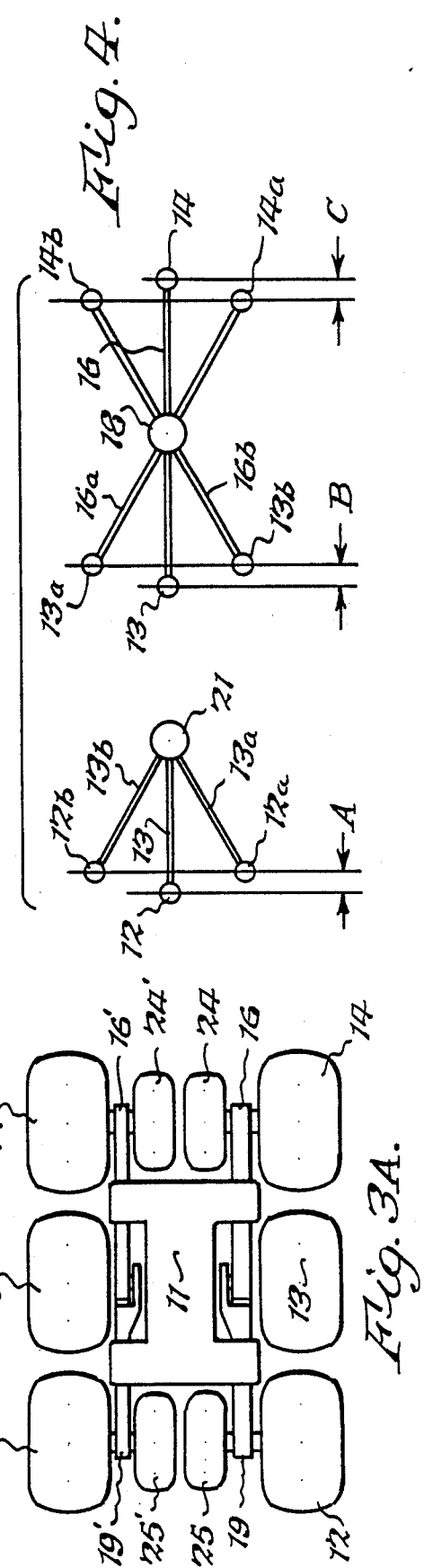

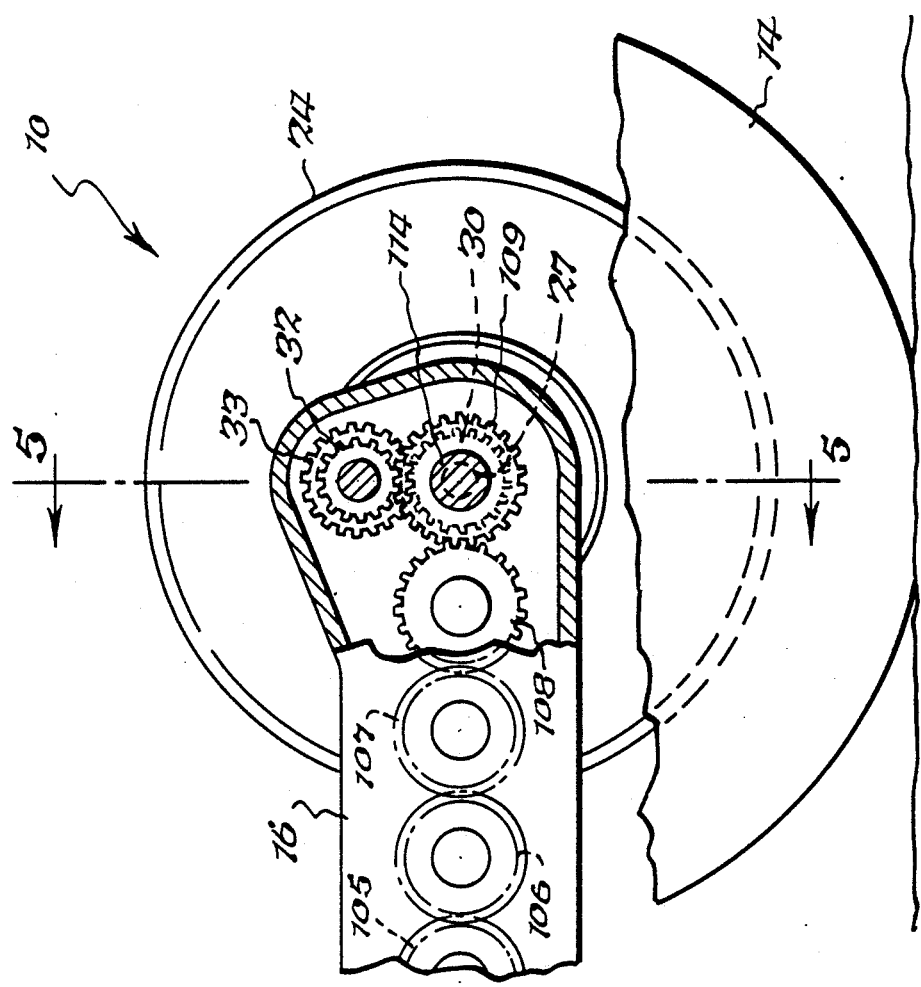
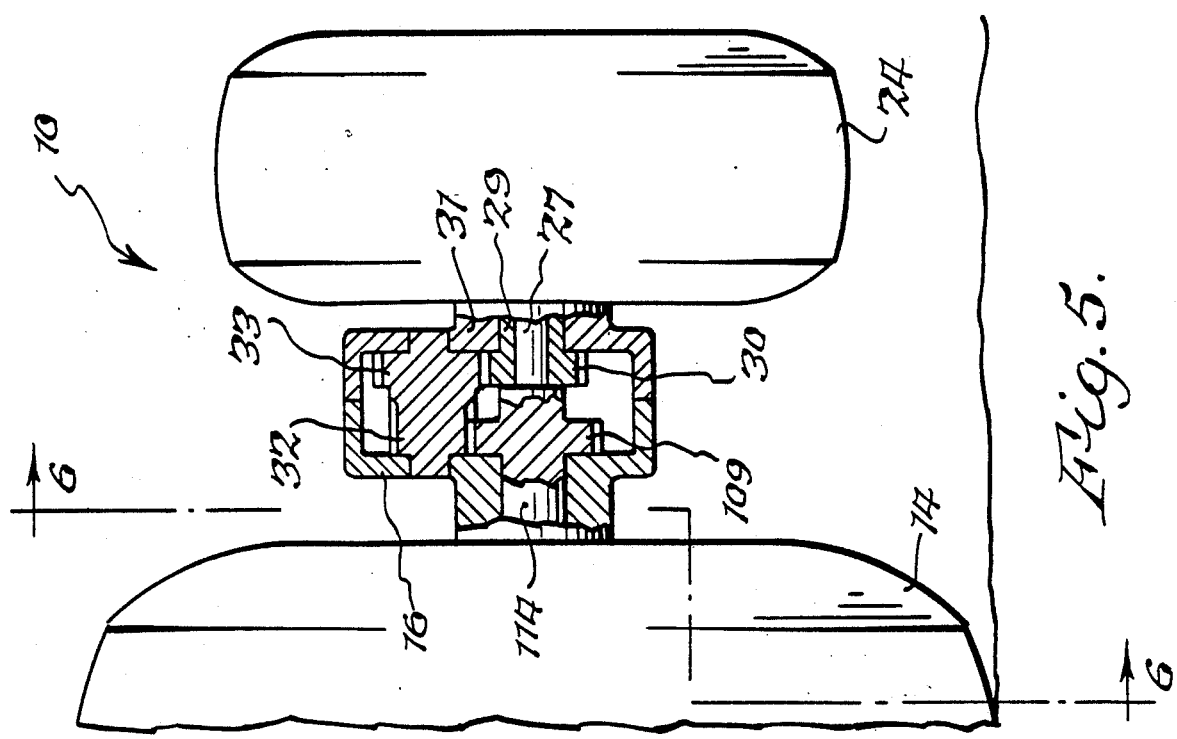

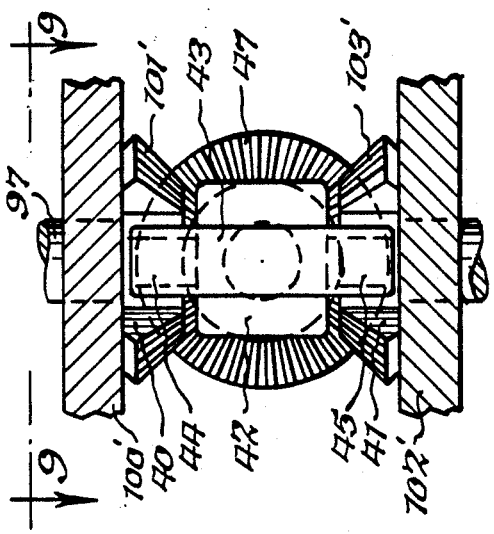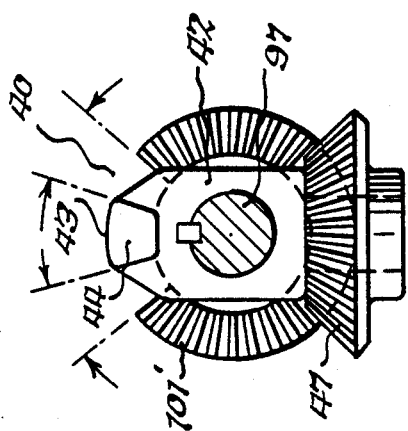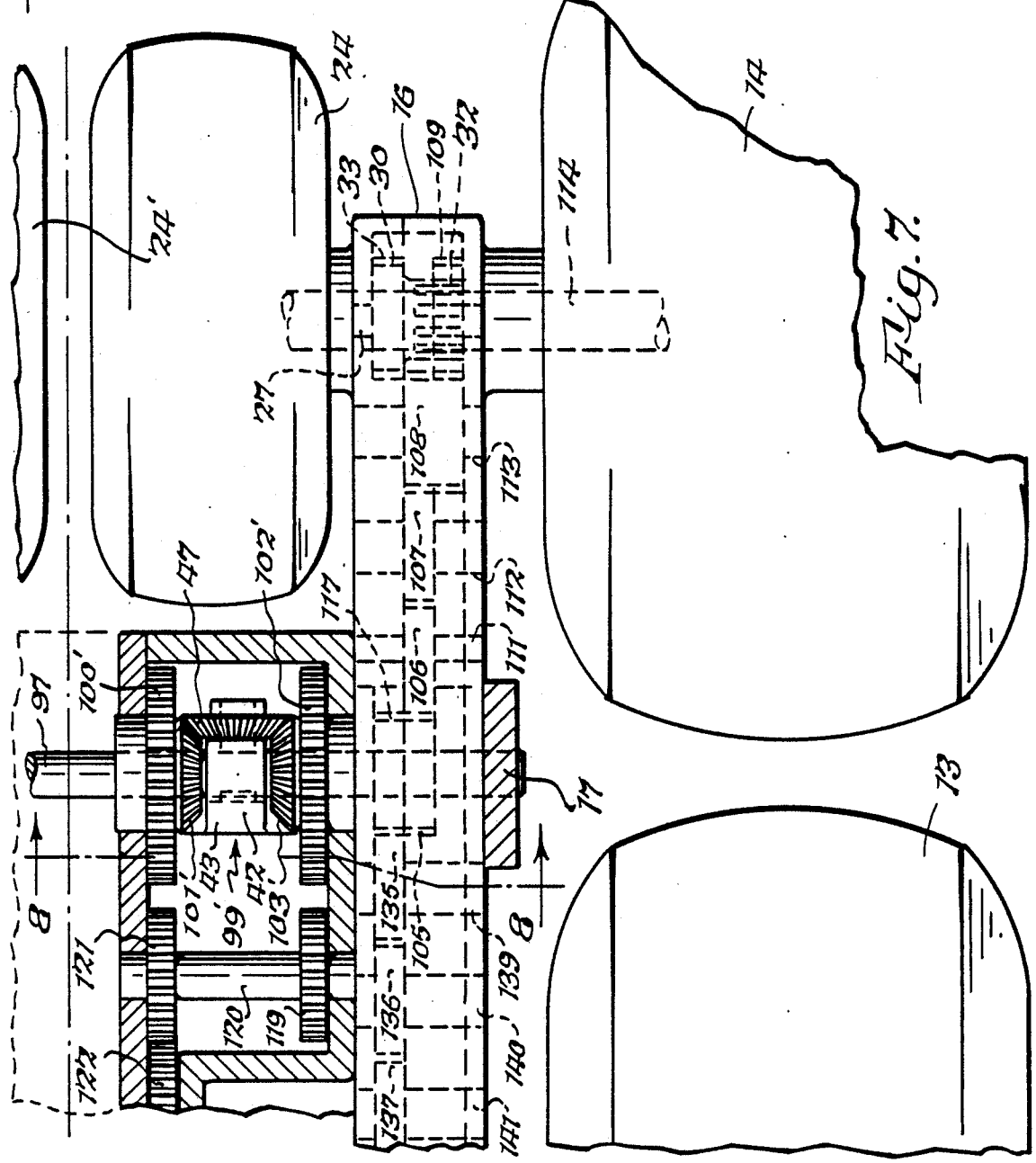

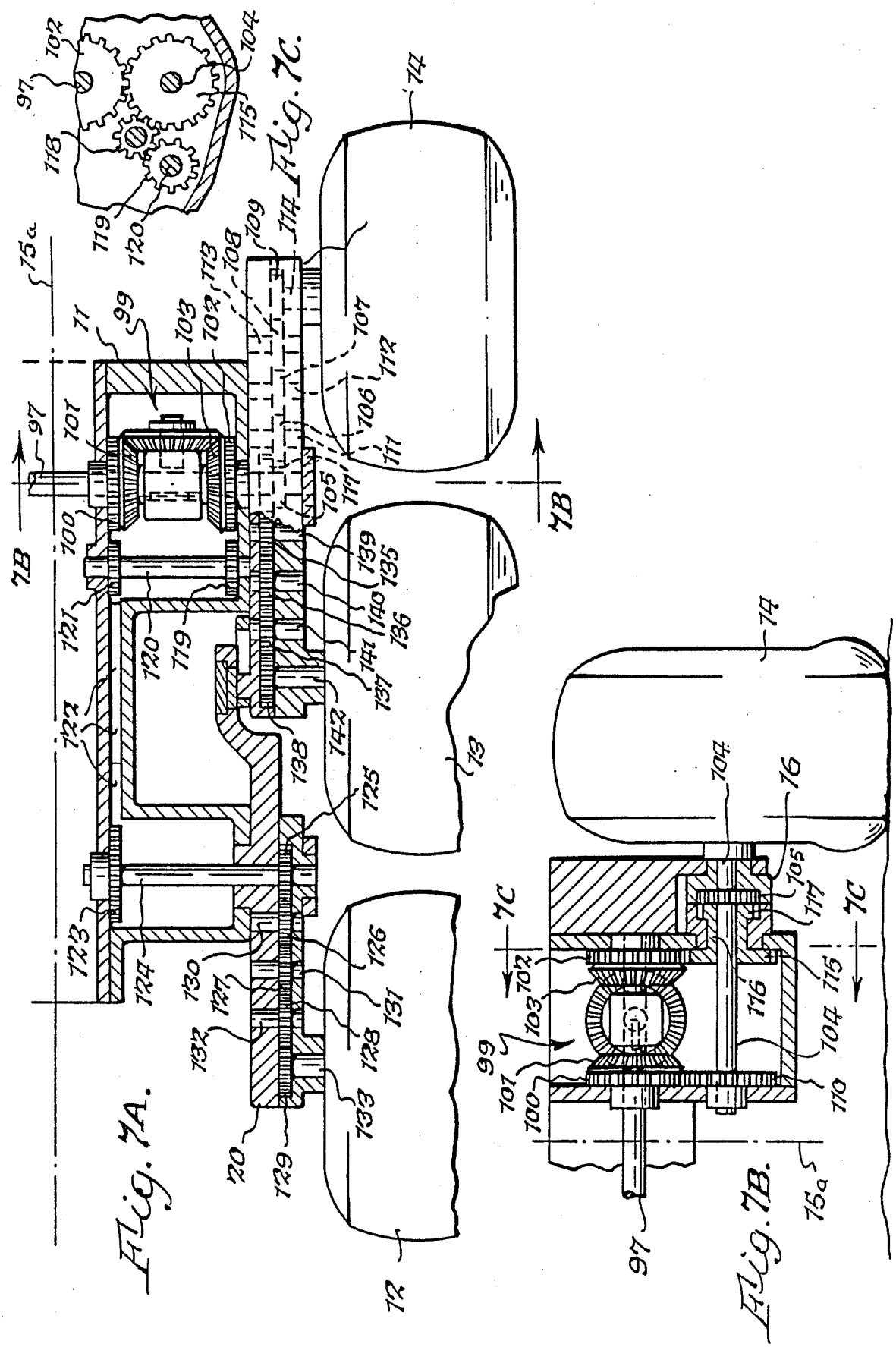

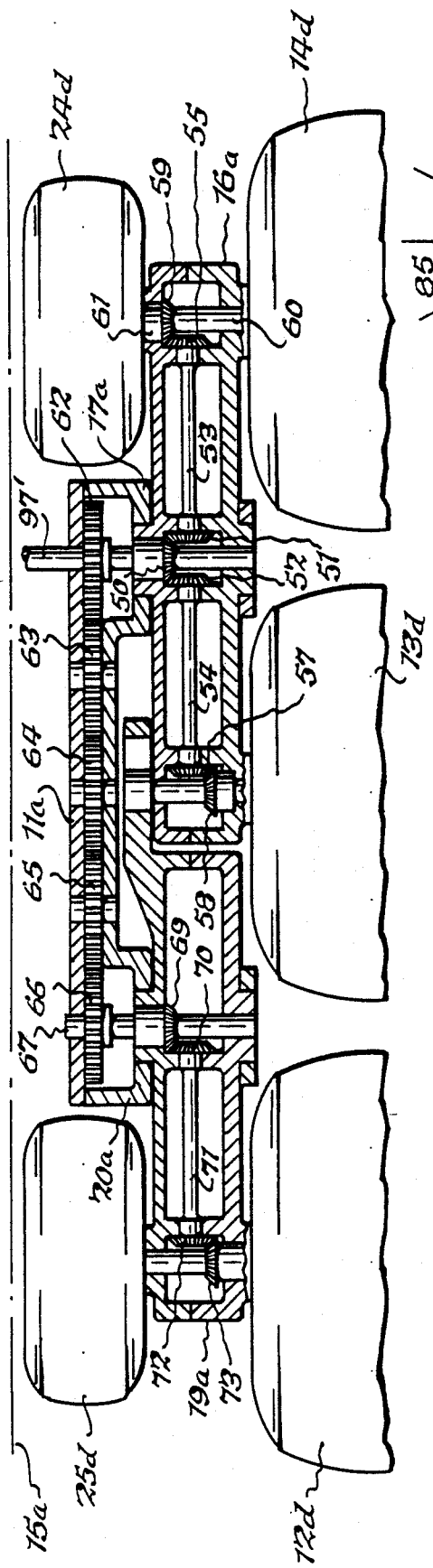
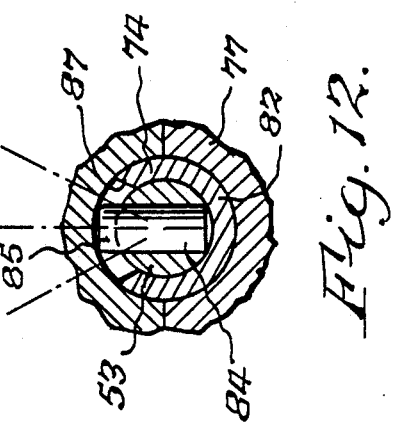
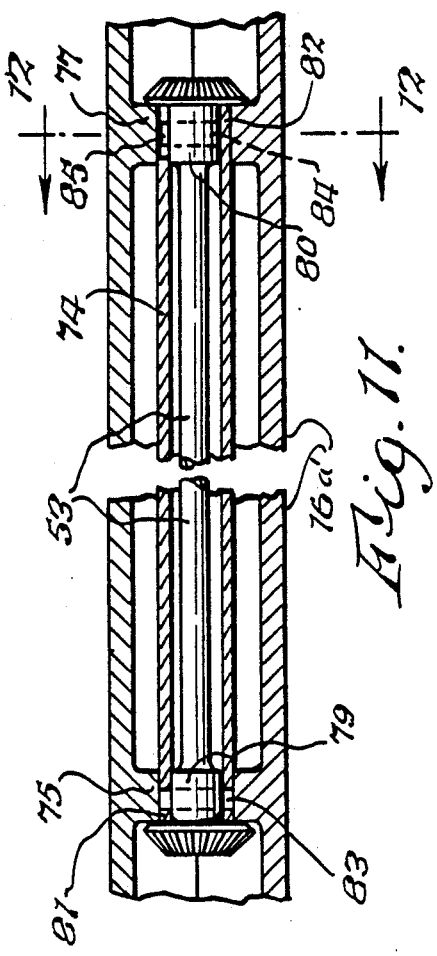

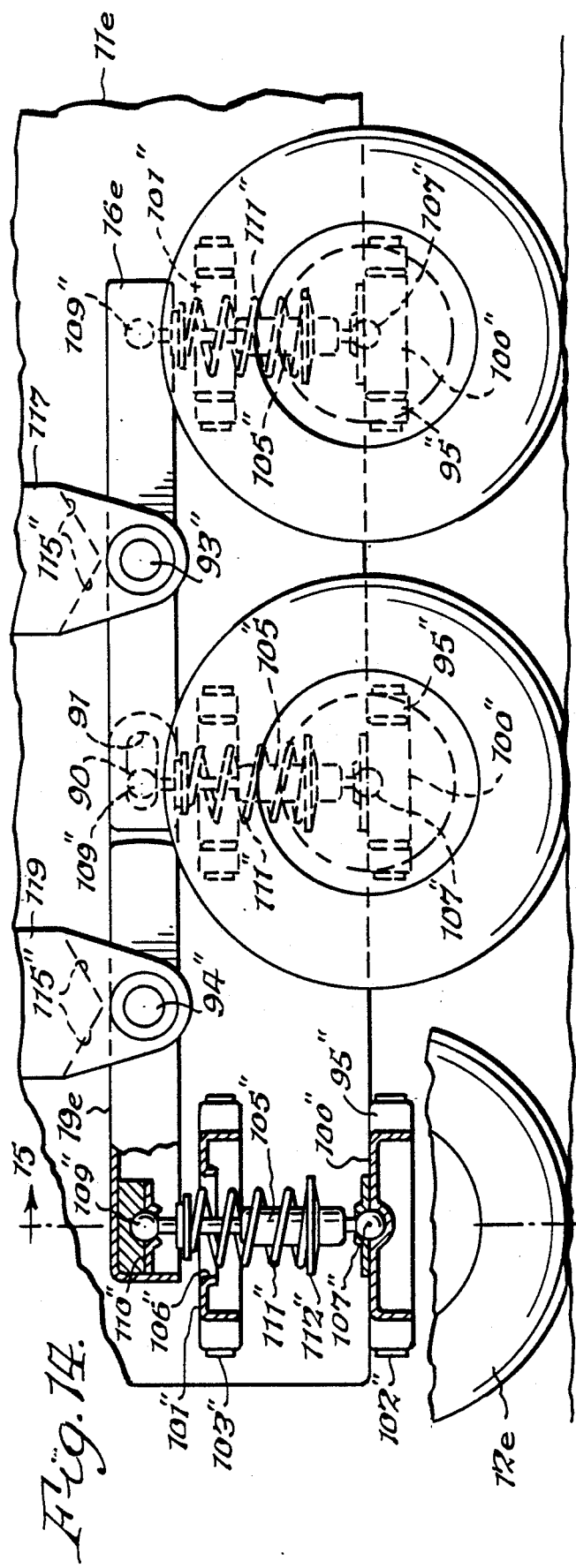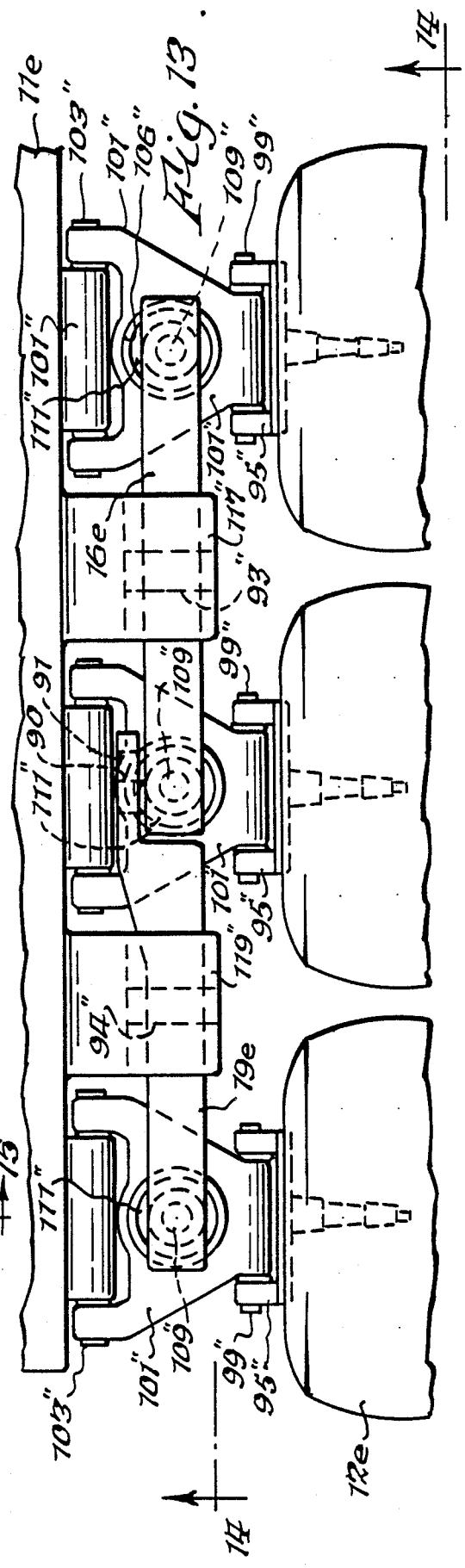

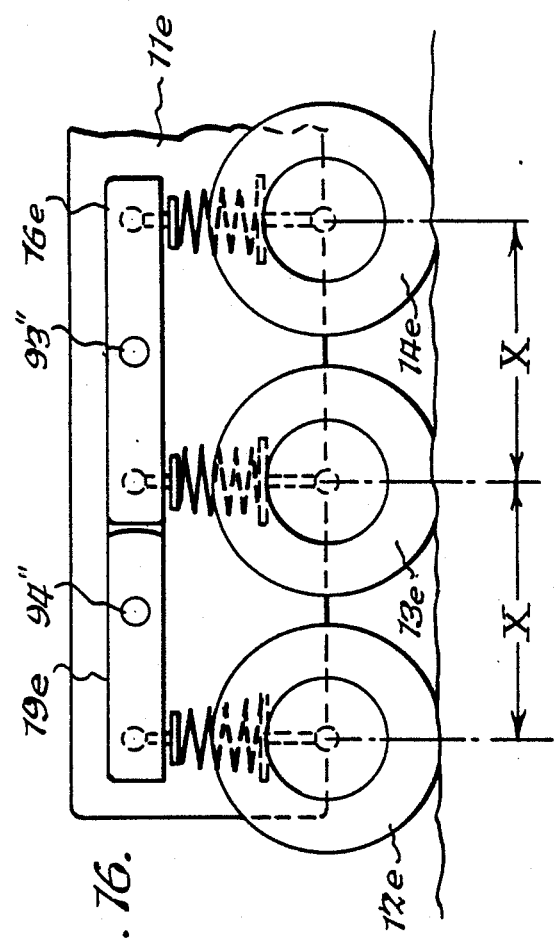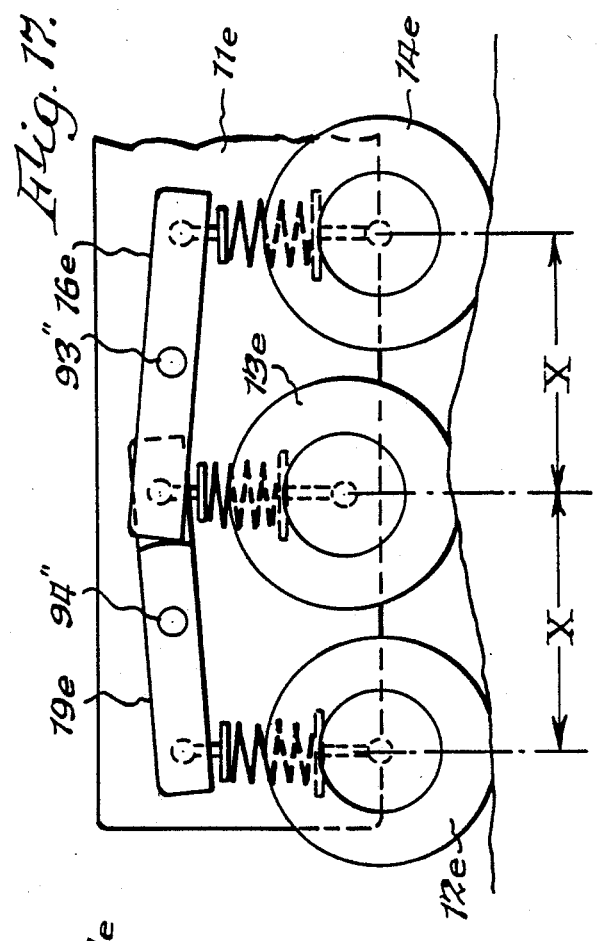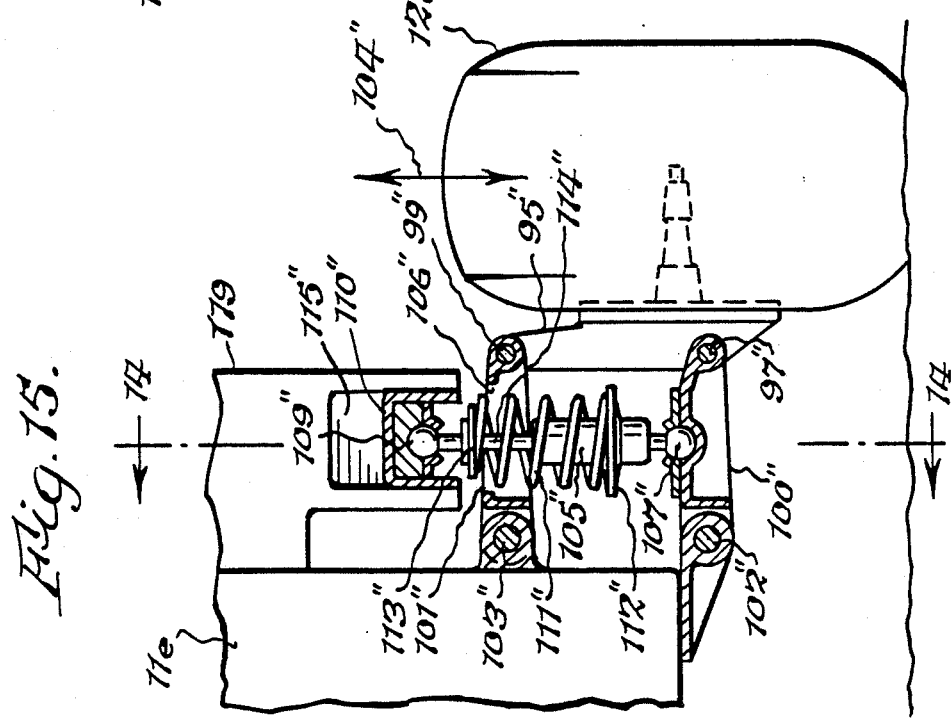

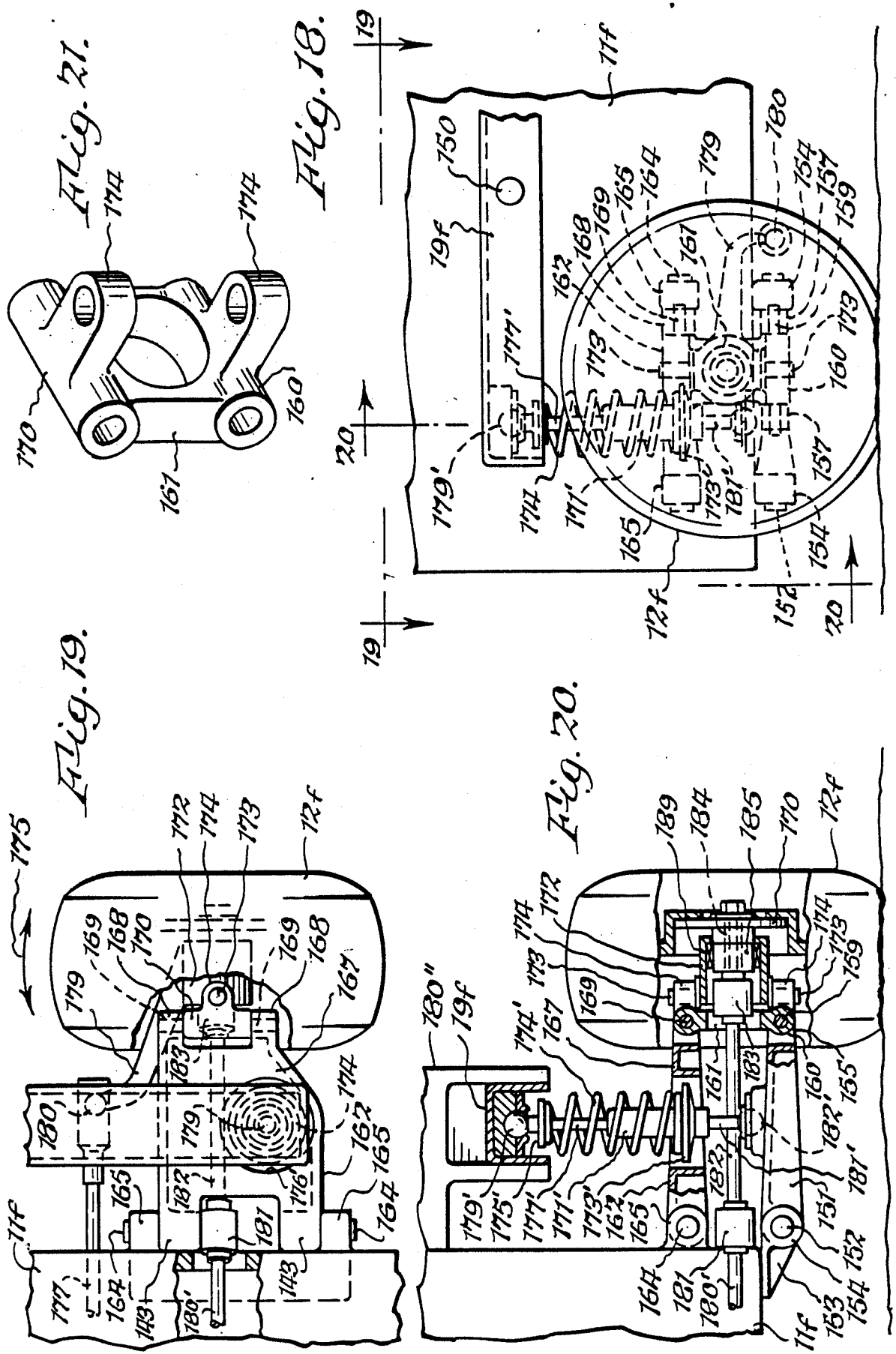

ALL-TERRAIN VEHICLE

This is a division of application Ser. No. 319,127 filed Mar. 3, 1989 now U.S. Pat. No. 4,941,539.

BACKGROUND OF THE INVENTION

The present invention relates to an all-terrain vehicle and includes improvements and modifications of the subject matter disclosed and claimed in patent application Ser. No. 116,397, filed Nov. 3, 1987, and now U.S. Pat. No. 4,817,747, issued on Apr. 4, 1989.

In the above U.S. Pat. No. 4,817,747 a six-wheeled vehicle is disclosed The vehicle has two bogies mounted on each side The two bogies on each side are movably connected to each other at their ends and are pivotally mounted on the vehicle body One of the bogies on each side mounts a wheel at each end, and the other bogie mounts a third wheel at its end remote from the other bogie. In the foregoing patent, various drives are disclosed for the wheels, along with linkages to maintain the bogies inclined at equal angles to the horizontal in all pivotal positions thereof. In certain of the drives disclosed in the above patent, if certain of the driven wheels were suspended above the ground, or were spinning on ice, the normal procedure was to brake the spinning wheel in order to preserve the drive to the remaining wheels. Furthermore, in the above patent, the bogies included portions which extended outwardly beyond the vehicle body and certain of the wheels were mounted on such extended portions However, if there were obstructions in the path of the ends of the bogies, they could be hung up on them. Furthermore, insofar as known, prior bogie suspensions of the above-described type did not have independently spring-shock mounted wheels which were capable of being positively driven and/or steered It is with overcoming the foregoing deficiencies of the prior constructions and with providing other embodiments of this type of vehicle that the present invention is concerned.

SUMMARY OF THE INVENTION

It is accordingly one object of the present invention to provide an all-terrain vehicle having wheels mounted on members which extend beyond the vehicle body and which also have auxiliary wheels mounted on the outer ends of the members so that they will guide the members over obstructions which may be in their way. A related object of the present invention is to provide a positive drive to such auxiliary wheels so that they can maintain traction with the obstructions even though their corresponding main wheels may be suspended above the ground.

Another object of the present invention is to provide an improved all-terrain vehicle having a drive to at least three wheels suspended on two interlinked bogies of the type described above, the drive being capable of producing a positive drive to all of the wheels even though certain of the wheels may be suspended above the ground or may be slipping on ice. A related object is to provide the foregoing drive in the form of a limited travel differential. A further related object is to provide the drive in the form of torsion bars which may yield to compensate for the horizontal travel of certain of the wheels mounted on the bogies toward and away from each other as the bogies pivot, thereby preventing scuffing of the wheels on the ground.

Yet another object of the present invention is to provide a limited travel differential which permits limited relative motion between two driven parts and thereafter automatically provides a positive drive thereto.

Still another object of the present invention is to provide a pivotal bogie construction having wheels mounted thereon wherein the wheels are suspended between the bogie and its associated vehicle body by means of spring-shock struts.

A still further object of the present invention is to provide an improved pivotal bogie suspension wherein independently spring-shock mounted wheels are capable of being driven and/or steered. Other objects and attendant advantages of the present invention will readily be perceived hereafter.

The present invention relates to a vehicle comprising a body, a plurality of wheels on opposite sides of said body, elongated links having outer end portions, pivot means mounting said elongated links on opposite sides of said body with said outer end portions extending beyond said body, inner and outer sides on said elongated links, a main wheel mounted outwardly of said outer side of each of said outer end portions of said elongated links, auxiliary wheel means, and means mounting said auxiliary wheel means inwardly of said inner side of each of said elongated links to guide said outer end portions of said elongated links over objects in the path of said auxiliary wheels.

The present invention also relates to a vehicle comprising a vehicle body, a plurality of wheels, means mounting said wheels for rotation on said body, drive means on said body for driving said wheels, and limited travel differential means between said wheels for limiting relative rotation of said wheels on opposite sides of said differential means.

The present invention also relates to a limited travel differential comprising first shaft means, a central block fixed to said first shaft means, first bevel gear means journalled on said first shaft means on opposite sides of said central block, second shaft means on said block and extending substantially perpendicularly to said first shaft means, second bevel gear means journalled on said second shaft means and in driving engagement with said first bevel gear means, and key means on said block for locking engagement with said first gear means to limit relative rotation of said first bevel gear means.

The present invention also relates to a wheel suspension for a vehicle body having a power source comprising a bogie having a central portion and spaced portions on opposite sides of said central portion, pivot means having a first axis for pivotally mounting said central portion of said bogie on said vehicle body, first and second wheels, first and second parallel shafts mounted on said bogie on opposite sides of said central portion mounting said first and second wheels, respectively, first and second means on said bogie for driving said first and second wheels, respectively, and a limited travel differential located between said power source and said first and second means to permit limited relative rotational movement of said first and second wheels.

The present invention also relates to a vehicle comprising a vehicle body, first and second bogies, first and second longitudinally spaced axles on said vehicle body mounting said first and second bogies, respectively, for pivotal movement, each of said bogies having inner and outer ends, means coupling said inner ends of said bogies for relative pivotal movement, wheels mounted on said first and second bogies in spaced relationship to said first and second axles, and spring-shock strut means coupled between said bogies and said vehicle body for mounting said wheels. The present invention also relates to a wheel suspension of the foregoing type including means for positively driving and/or steering any of the spring-shock suspended wheels.

The present invention also relates to a vehicle comprising a vehicle body, first and second bogies, first and second longitudinally spaced axles on said vehicle body mounting central portions of each of said first and second bogies, respectively, for pivotal movement, each of said bogies having inner and outer ends, means mounting an outer wheel for rotation on each outer end of each of said first and second bogies, means mounting an inner wheel on the inner end of said second bogie, linkage means coupling said inner ends of said first and second bogies for causing said first and second bogies on said side of said vehicle to pivot in unison, and drive means in each of said first and second bogies for positively driving all of said inner and outer wheels, said drive means including torsion bar means for permitting relative motion between certain of said wheels.

The various aspects of the present invention will be more fully understood when the following portions of the specification are read in conjunction with the accompanying drawings wherein:

BRIEF DESCRIPTION OF THE DRAWINGS

FIG. 1 is a side elevational view of one side of the improved all-terrain vehicle of the present invention;

FIG. 2 is a fragmentary plan view taken in the direction of arrows 2—2 of FIG. 1 and showing the portion of the vehicle to one side of its centerline;

FIG. 3 is a front elevational view taken substantially in the direction of arrows 3—3 of FIG. 1;

FIG. 3A is a diminutive plan view of the all-terrain vehicle showing all of the bogies and all of the wheels;

FIG. 3B is a schematic view showing the bogies at one limit of movement;

FIG. 3C is a schematic view showing the bogies at the opposite limit of movement from FIG. 3B;

FIG. 4 is a schematic view showing the increments of horizontal movement of the wheels on the bogies in response to changes in angles of the latter;

FIG. 5 is an enlarged fragmentary view, partially in cross section, taken substantially along line 5—5 of FIG. 6 and showing a gearing arrangement for positively driving the smaller inner wheel at the same peripheral speed as the larger outer wheel;

FIG. 6 is a fragmentary view, partially in cross section, and partially broken away, taken substantially along line 6—6 of FIG. 5 and showing the gearing arrangement for positively driving the smaller inner wheel and larger outer wheel at the same peripheral speed;

FIG. 7 is an enlarged fragmentary plan view showing a limited travel differential for permitting limited relative rotational motion among the three wheels mounted on interconnected bogies on one side of the vehicle but causing a positive drive among all three wheels beyond the limit of relative rotational motion, FIG. 7A is a fragmentary plan view of a drive for the three wheels which incorporates a differential for permitting relative rotational motion therebetween while maintaining a positive drive thereto;

FIG. 7B is a fragmentary cross sectional view taken substantially along line 7B—7B of FIG. 7A;

FIG. 7C is a fragmentary cross sectional view taken substantially along line 7C—7C of FIG. 7B;

FIG. 8 is a fragmentary cross sectional view taken substantially along line 8—8 of FIG. 7 and showing primarily the structure of the limited travel differential;

FIG. 9 is a cross sectional view taken substantially along line 9—9 of FIG. 8;

FIG. 10 is a fragmentary plan view, partially in cross section, of a modified embodiment of the present invention wherein the drive to the various wheels mounted on the interconnected bogies is in part through torsion bars which will twist to permit changes in relative rotational positions among the wheels mounted on the bogies;

FIG. 11 is a fragmentary cross sectional view of a modified torsion bar construction which can be used in the embodiment of FIG. 10;

FIG. 12 is a fragmentary cross sectional view taken substantially along line 12—12 of FIG. 11;

FIG. 13 is a fragmentary plan view of still another modified embodiment of an interconnected bogie construction wherein the three wheels mounted on two bogies on one side of the vehicle are mounted on spring-shock struts in such a manner so that the wheels do not advance and recede horizontally relative to each other as the bogies change their angularity;

FIG. 14 is a fragmentary side elevational view, partially in cross section, taken substantially along line 14—14 of FIG. 13;

FIG. 15 is a fragmentary cross sectional view taken substantially along line 15—15 of FIG. 14;

FIG. 16 is a fragmentary reduced view of FIG. 14 showing the bogies in a horizontal position when the wheels are traveling on horizontal ground;

FIG. 17 is a view similar to FIG. 16 but showing the bogies inclined relative to each other when the wheels are on ground which is not level;

FIG. 18 is a fragmentary side elevational view of a bogie such as shown in the preceding figures having a spring-shock wheel suspension which is both positively driven and steerable;

FIG. 19 is a fragmentary plan view taken substantially in the direction of the arrows 19—19 of FIG. 18;

FIG. 20 is a fragmentary view, partially in cross section, taken substantially along line 20—20 of FIG. 18; and FIG. 21 is a perspective view of the ring mounted at the ends of the links of the suspension of FIGS. 18-20.

BRIEF DESCRIPTION OF THE DRAWINGS

The all-terrain vehicle 10 of FIGS. 1-6 is an improvement over the all-terrain vehicle disclosed and claimed in my copending application Ser. No. 116,397, filed Nov. 3, 1987 and now U.S. Pat. No. 4,817,747, issued on Apr. 4, 1989. The all-terrain vehicle 10 includes a vehicle body 11 having three main wheels 12, 13 and 14 on one side of the centerline 15 of body 11 and three corresponding identical main wheels 12', 13, and 14', respectively, on the opposite side of centerline 15 of vehicle body 11. Wheels 13 and 14 are mounted on the outer end of beam or bogie 16 which is pivotally mounted at 18 on standard 17 of vehicle body 11. Wheel 12 is mounted on beam or bogie 19 pivotally mounted at 21 on standard 20 of vehicle body 11. As the vehicle 10 travels over uneven ground, the bogies 16 and 19, and their corresponding bogies 16' and 19' on opposite sides of the vehicle, pivot about their various pivots. The bogies on each side of the vehicle pivot independently of the bogies on the other side of the vehicle. Bogie 16 is coupled to bogie 19 by a pin and slot connection. More specifically pin 22 at the inner end of bogie 16 rides in slot 23 in the inner end of bogie 19. This arrangement causes bogies 16 and 19 to always assume the same inclination to the horizontal in all pivotal positions thereof. A corresponding pin and slot connection also exists between the bogies 16' and 19' on the opposite side of the vehicle. Alternatively, if desired, a linkage, such as shown in the above-mentioned U.S. Pat. No. 4,817,747, may be utilized and this linkage is incorporated herein by reference. Also, any other suitable linkage may be used to cause bogies 16 and 19 and their counterparts on the opposite side of the vehicle to always be at the same inclination to the horizontal in all pivotal positions thereof.

As explained in the above-mentioned U.S. Pat. No. 4,817,747, there is a gear drive to all of the three vehicle wheels on each side of the vehicle. Thus, all six wheels are positively driven. This drive is shown in FIGS. 7A, 7B and 7C which correspond to FIGS. 17, 18 and 19, respectively, of U.S. Pat. No. 4,817,747, which is incorporated herein by reference. Insofar as pertinent here, bogie 16 includes gears 105, 106, 107, 108 and 109, such as shown in FIGS. 7A, 7B and 7C. It will be understood that bogie 16 also carries the remainder of the gears shown in FIGS. 7A-7C.

In accordance with one aspect of the present invention, auxiliary inner wheels 24 and 24' are coaxially mounted with wheels 14 and 14', respectively, on bogies 16 and 16', respectively. In addition, a wheel 25 is coaxially mounted with wheel 12 at the outer end of bogie 19 and a wheel 25' is coaxially mounted with wheel 12' at the outer end of bogie 19'. Inner wheels 24, 24', 25 and 25' essentially shield the outer ends of the bogies on which they are mounted against hanging up on irregularities on the ground over which the vehicle passes. In other words, if there should be some obstruction on the ground in the path of the outer end of any of the bogies and which also lies in the path of an inner wheel associated with that bogie, that inner wheel will raise the bogie over the obstruction. All of the inner wheels may be journalled on their respective shafts for free-rotational motion, but preferably they are geared to rotate at the same peripheral speed as the outer wheels with which they are associated. In this respect shaft 114, which drives wheel 14 and which has gear 109 keyed thereto, has an outer stub shaft 27 formed integrally therewith which is journalled in stem 29 (FIG. 5) of gear 30 which in turn is journalled in bearing 31 mounted in bogie 16. Gear 109 is in mesh with gear 32 formed integrally with gear 33, both of which are journalled in bogie 16. Gear 33 is in mesh with gear 30. Thus, gear 109 which is driven by the chain of gears shown in FIGS. 6 and 7A drives gear 30 through gears 32 and 33. Gear 30 is keyed to stem 29 which in turn is keyed to wheel 24. The ratio of gears 109, 32, 33 and 30 is such that wheel 24 is driven at the same peripheral speed as wheel 14 with which it is coaxial. The same drive arrangement is associated with wheels 14' and 24', and gearing such as 109, 32, 33 and 30 is associated with both wheels 25 and 25'. Thus, all four auxiliary wheels 24, 24', 25 and 25' are preferably positively driven, but they may be idle. While the auxiliary wheels have been shown as being coaxial with their respective associated wheels, it will be appreciated that their axes can be located either forwardly or rearwardly of the axes of their associated wheels, and appropriate gearing may be used to transmit motion thereto.

As explained in U.S. Pat. No. 4,817,747, which is incorporated herein by reference, and as depicted in FIGS. 3B and 3C, as the bogies 16 and 19 pivot between their positions shown in FIG. 3B and their positions shown in FIG. 3C, and as explained relative to FIG. 4, there can be scuffing among the wheels 12, 13 and 14 and among the wheels 12', 13' and 14', all of which are positively driven, in the absence of structure for compensating for such scuffing. More specifically, at one limit of travel of bogies 16 and 19, as shown in FIG. 3B, the wheels 12, 13 and 14 will occupy the positions 12b, 13b and 14b. In the opposite limit of travel of bogies 16 and 19, the wheels 12, 13 and 14 will occupy the positions shown at 12a, 13a and 14a. The positions of FIGS. 3B and 3C are superimposed on FIG. 4 wherein the amount of travel A, B and C is shown in which there would be scuffing in the absence of structure to compensate for the pivotal movement of bogies 16 and 19.

In FIG. 4, when bogies 16 and 19 are in a horizontal attitude, as shown in FIG. 1, wheels 12, 13 and 14 are in the relative positions designated by these numerals. When bogie 16 pivots to the position shown in FIG. 3B, bogie 19 will pivot accordingly to the position shown in FIG. 3B. At this time the wheels 12, 13 and 14 will be positioned at locations 12b, 13b and 14b shown in FIG. 4. Thus, wheel 12 will move to the right to the position 12b, wheel 13 will move to the right to the position 13b, and wheel 14 will move to the left to the position 14b. Stated otherwise, wheel 12 moves to the right a distance of A, wheel 13 moves to the right a distance B, and wheel 14 will move to the left a distance of C, which is equal to the distances A and B. When bogies 16 and 19 pivot to the positions shown in FIG. 3C, wheel 12 will move to the position 12a, wheel 13 will move to the position 13a and wheel 14 will move to the position 14a. Thus, wheel 12 will have moved a distance A to the right, wheel 13 will have moved a distance B to the right, and wheel 14 will have moved a distance C to the left. All of these distances A, B and C are equal. Thus, in all positions of the bogies 16 and 19 between their extreme limits of movement, wheels 12 and 13 will always move in the same direction equal amounts which is equal to the amount moved by wheel 14 in the opposite direction. When the foregoing shifting of vehicle wheel positions occur in response to the pivoting of bogies 16 and 19, there will be a scuffing of wheel C relative to the ground, in the absence of structure for compensating for such scuffing. In this respect, because distances A and B are substantially equal while wheels 12 and 13 move in the same direction, there will be no scuffing as between them. However, vehicle wheel 14 will be moving in an opposite direction and thus it will scuff relative to the ground because the two wheels 12 and 13 have a combined greater traction than wheel 14. All of the foregoing is fully explained in U.S. Pat. No. 4,817,747, referred to above, which is incorporated herein by reference.

In U.S. Pat. No. 4,817,747, there is disclosed a gearing arrangement in FIGS. 17, 18 and 19 for overcoming scuffing. These figures are reproduced here as FIGS. 7A, 7B and 7C, respectively, with minor modifications in numerals in the interest of explaining applicant's subject matter of FIGS. 7, 8 and 9. In FIGS. 7A, 7B and 7C a vehicle is shown. This vehicle has round wheels 12, 13 and 14 on one side of vehicle body 11 and corresponding round vehicle wheels on the opposite side of vehicle body centerline 15. The drive to vehicle wheels 12, 13 and 14 is from a suitable engine through shaft 97 and differential 99. A mirror image drive (not shown) is located on the opposite side of centerline 15 to drive the counterparts of vehicle wheels 12, 13 and 14. More specifically relative to wheels 12, 13 and 14, a gear 100 (FIG. 7A) is keyed to gear 101 of the differential, and a gear 102 is keyed to gear 103 of the differential. When wheels 12, 13 and 14 are not slipping relative to each other, gears 100 and 102 will be driven by the differential without relative movement therebeween, as is well known. Gear 100 is in mesh with gear 110 (FIG. 7B) which is keyed to shaft 104 and which has gear 105 keyed thereon. Gear 105 on shaft 104 drives gears 106, 107, 108 and 109 which are mounted on shafts 111, 112, 113 and 114, respectively, in bogie 16. Shaft 104 lies on the centerline of the axle for bogie 16. Shaft 114 is the axle for wheel 14 which it drives.

A gear 115 is in mesh with gear 102 and this gear is keyed to sleeve 116 which has gear 117 keyed thereto. Sleeve 116 is rotatable on shaft 104. Gear 115 drives gear 118 (FIG. 7C) which in turn drives gear 119 which is keyed to shaft 120 onto which gear 121 is also keyed. A gear train generally depicted by numeral 122 extends between gear 121 and gear 123 keyed to shaft 124 which also has gear 125 keyed thereon. Shaft 124 is also on the centerline for the axle for bogie 19. Gear 125 drives gears 126, 127, 128 and 129 which are mounted on shafts 130, 131, 132 and 133, respectively, in bogie 19. Shaft 133 is driven by gear 129 and serves as the axle which drives wheel 12a. As noted above, gear 117 is keyed to sleeve 116 with gear 115 and, as gear 115 is driven, gear 117 drives gears 135, 136, 137 and 138 which are mounted on shafts 139, 140, 141 and 142, respectively. Shaft 142 has gear 138 keyed thereon and serves as the axle which drives wheel 13a.

Because the bogie construction 16, 19 of FIGS. 7A-7C is identical to that described above relative to FIGS. 1-4, which includes the linkage for maintaining the bogies at equal inclinations to the horizontal in all pivotal positions thereof, the same action will be obtained as described above relative to FIG. 4, namely, as the bogies pivot back and forth about their axles in following an uneven terrain, wheels 12 and 13 will move equal amounts in the same direction and wheel 14 will move an equal amount in the opposite direction. However, since there is a differential 99 which is effectively interposed between wheel 14 on one hand, and wheels 12 and 13 on the other hand, the scuffing between these wheels which move in opposite directions will be eliminated. In other words wheels 12 and 13 moving in the same direction the same amounts in unison as bogies 16 and 19 pivot would tend to drag wheel 14 which moves in the opposite direction. The differential 99 eliminates the drag. If wheels 12 and 13 did not move the same amounts in the same direction, there could be scuffing therebetween, and the use of the pin and slot connection 22-23 avoids such scuffing between wheels 12 and 13 because it causes them to move horizontally equal amounts as they move in the same direction.

The structure of FIGS. 7, 8 and 9 is an improvement over the structure of FIGS. 7A, 7B and 7C. More specifically, if one of wheels 13 or 14 is suspended above the ground, as may occur in certain attitudes of the vehicle, or if it was spinning on ice, the differential 99 will not transmit motion to the other of the wheels thereby terminating the drive. Of course, this could be overcome by applying a braking force to the spinning wheel to thereby permit the differential 99 to drive the other wheels. However, the foregoing failure to transmit motion can also be overcome without braking by the modified differential structure of FIGS. 7-9. In this respect, a limited travel differential 99' (FIG. 7) is utilized instead of the normal differential 99 (FIG. 7A). The remainder of the gearing in FIG. 7 is effectively the same as the gearing in FIG. 7A. The limited travel differential 99' includes bevel gears 101' and 103', which are fixed to gears 100' and 102', respectively, and which have cutouts at 40 and 41. The central block 42, which is keyed to shaft 97, has a pin 43 secured thereto and it has ends 44 and 45 which extend into cutout portions 40 and 41, respectively, of gears 101' and 103', respectively. A bevel gear 47 is in mesh with bevel gears 101' and 103'. The cutout portions 40 and 41 define arcs which correspond to the maximum amount of differential action which is required to accommodate the extreme limits of pivotal movement of bogies 16 and 19. Stated otherwise, when the wheels 12, 13 and 14 move between their extreme limits A, B and C of FIG. 4, there will be a differential action produced by differential 99' because there can be relative movement between gear 47 and gears 101' and 103'. However, at the limit of such movement, pin 43 will engage the sides of cutouts 40 and 41 to thereby terminate the action of differential 99' to provide a positive drive to all of the wheels 12, 13 and 14. Thereafter, as bogies 16 and 19 move away from their extreme limits of pivotal movement, the differential action will again be reinstituted as pin 43 moves to a more central position within cutouts 40 and 41. Thus, the limited travel differential 99' of FIGS. 7-9 permits bogies 16 and 19 to pivot between their extreme positions without accompanying scuffing of wheels 12, 13 and 14 while providing a positive drive to all of the wheels in the event that one of wheels 13 or 14 should be suspended above the ground or slipping on ice. While a limited travel differential 99' has been disclosed only relative to wheels 12, 13 and 14, it will be appreciated that there is another limited travel differential, such as 99', associated with wheels 12', 13' and 14' which have analogous gearings to those discussed above relative to FIGS. 7A, 7B, 7C and 7.

Another embodiment of the present invention is shown in FIGS. 10, 11 and 12. In this embodiment bogies 16a and 19a correspond to bogies 16 and 19 of the previous figures. Bogie 16a is pivotally mounted on standard 17a, and bogie 19a is pivotally mounted on standard 20a, both of which are mounted on the vehicle body 11a. A main drive shaft 97' is coupled to the vehicle engine (not shown) and it has a bevel gear 50 keyed thereto which is in mesh with bevel gears 51 and 52 keyed to the ends of torsion bars 53 and 54, respectively. Bevel gears 55 and 57 are keyed to the opposite ends of torsion bars 53 and 54, respectively. Bevel gear 55 is in mesh with bevel gear 59 which is keyed to shaft 60 which drives wheel 14d which corresponds to wheel 14 of the previous figures. Bevel gear 57 is in mesh with bevel gear 58 which is keyed to the shaft which drives wheel 13d. A suitable planetary gearing (not shown) or other suitable gearing may be coupled to shaft 61 which drives auxiliary wheel 24d, which corresponds to wheel 24 of the previous figures, so that wheels 14d and 24d will travel at the same peripheral speed. Alternatively, as noted above, wheel 24d may spin freely.

A gear 62 is keyed to shaft 97' and it drives gears 63, 64, 65 and 66, the latter of which drives shaft 67 having bevel gear 69 keyed thereto which is in mesh with bevel gear 70 keyed to the end of torsion bar 71 having bevel gear 72 keyed to its opposite end which is in mesh with bevel gear 73 keyed to the shaft to which wheel 12d is keyed. A suitable gear structure (not shown) may be associated with supplemental wheel 25d, which corresponds to wheel 25 of the previous figures, to cause it to travel at the same peripheral speed as wheel 12d. Alternatively, wheel 25d may spin freely.

As noted above, in unmodified gearing there is scuffing of wheels 12d, 13d and 14d in response to pivotal action of connected bogies, such as 16a and 19a, as is fully described above. In the embodiment of FIGS. 7A, 7B and 7C, the scuffing was compensated for by the differential, but if either wheel 13 or 14 was spinning freely, as would occur if it was suspended above the ground or slipping on ice, the drive to the other of the wheels would be terminated. In FIGS. 7, 8 and 9 the scuffing was also compensated for by a limited travel differential which provided a positive drive to wheels 13 and 14 so that if the other of the wheels was suspended above the ground or on ice, the remainder of the wheels would still drive. The embodiment of FIGS. 10, 11 and 12 achieves the same result as the embodiment of FIGS. 7, 8 and 9, but in a different manner. In this respect, torsion bars 53, 54 and 71 can twist to compensate for the travel of wheels 12d, 13d and 14d the horizontal distances A, B and C, such as described relative to FIG. 4. However, the torsion bars will still maintain positive driving contact with the wheels even while they are twisting to compensate for the horizontal movement of the wheels. In an embodiment such as shown in FIG. 10 having three torsion bars, the wheels do not have to be spaced equal distances from the pivots of their respective bogies because any unequal horizontal movements of the wheels 12d, 13d and 14d will be compensated for by the twisting of the torsion bars 71, 54 and 53, respectively. Furthermore, since the torsion bars compensate for horizontal movements of wheels 12d, 13d and 14d, the bogies 16a and 19a need not be linked to assume the same inclinations to the horizontal in all pivotal positions thereof. It will be appreciated that a torsion bar with suitable gearing on its ends may be substituted for the gear train 63, 64, 65 and 66 of FIG. 10. The suitable gearing may be bevel gears, such as shown on the other torsion bars.

In FIG. 11, a modified torsion bar structure is shown. For example, torsion bar 53 can have a sleeve 74 coaxial therewith. The ends 81 and 82 of sleeve 74 are journalled at 75 and 77, respectively, within bogie 16a'. The enlarged ends 79 and 80 of torsion bar 53 are journalled in the ends 81 and 82, respectively, of sleeve 74. Pins 83 and 84 are secured within the ends 79 and 80, respectively, of torsion bar 53. The end 85 of pin 84 rides in slot 87 of sleeve 74. Slot 87 is equivalent to the maximum distance required for torsion bar 53 to twist to accommodate the maximum limits of pivotal movement of bogie 16a'. Thus, since wheels 12d and 13d will move in the same direction, such as depicted by distances A and B of FIG. 4 and since wheel 14d will move in an opposite direction as depicted by distance C of FIG. 4, the twisting of torsion rod 53 will permit wheel 14d to maintain rolling contact with the ground without scuffing while being driven. Also, even though wheel 12d may be suspended above the ground, wheels 13d and 14d will still be positively driven. However, once the limit of movement of bogie 16a is experienced, pin 84 will engage sleeve 74 at the ends of slot 87 so that sleeve 74 can supplement the strength of torsion bar 53 which, because of its inherent spring action, may not be sufficiently strong to transmit the proper torque to wheel 14.

While FIG. 10 has shown three torsion bars 53, 54 and 71, each of which provides a spring action to its associated wheel, it will be appreciated that a torsion bar need only be at 53 and that torsion bars 54 and 71 can have regular shafts substituted therefor in view of the fact that wheels 12d and 13d both move in the same direction while wheel 14d moves in the opposite direction and the latter is the wheel for which there must be compensation to prevent scuffing as bogie 16a pivots. In FIGS. 10-12 only one side of the vehicle has been shown. However, it will be appreciated that a corresponding opposite side of the vehicle is provided on the other side of centerline 15a.

In FIGS. 13-17 a still further embodiment of the present invention is disclosed. In this embodiment wheels 12e, 13e and 14e correspond to wheels 12, 13 and 14 of the preceding figures. In addition, bogies 16e and 19e correspond to bogies 16 and 19. Bogie 16e includes a pin 90 which rides in slot 91 of bogie 19e so that they are pinned together as described above relative to the other figures. Bogies 16e and 19e pivot on body 11e at pivots 93 and 94, respectively.

The structure of FIGS. 13-17 essentially shows how the double bogie suspension can be utilized with a spring-shock type of wheel suspension. More specifically, each wheel 12e, 13e and 14e is mounted on a bracket 95" which is pinned at its lower and upper portions by pins 97" and 99", respectively, to brackets 100" and 101", respectively, which in turn are pinned at 102" and 103", respectively, to vehicle body 11e, to thereby provide a parallelogram linkage which permits each of the wheels 12e, 13e and 14e to move vertically in the directions depicted by arrows 104". The housing of shock absorber 105" has a lower ball connection 107" with bracket 100" and has a piston rod 114" which has an upper ball connection 109" with bracket 110" which is secured to bogie 19e. A spring 111" has a lower portion which bears on bracket 112" secured to the housing of shock absorber 105" and an upper portion which bears against bracket 113" secured to piston rod 114" of the shock absorber. The spring and shock absorber piston pass through hole 106" in bracket 101". Stops 115" are located on standards 117 and 119 which carry pivots 93" and 94", respectively, to define the limits of pivotal motion of the bogies 16e and 19e. However, if desired, cushioned bumpers can be secured to the vehicle body to define the limits of pivotal movement of the bogies. While the suspension structure was described only relative to wheel 12e, identical suspension structures are used with wheels 13e and 14e.

The suspension of FIGS. 13-17 thus shows how the double bogie construction 16e-19e can be used with a spring-shock type wheel suspension. It is to be further noted that in this suspension, the horizontal distances X between wheels remain the same in all inclinations of the bogies 16e and 19e. It is the shock absorber 105" associated with each wheel which changes its inclination with pivotal movement of the bogies because of its double-ball connection.

In all of the foregoing embodiments, the wheels on the bogie which mounts two wheels, such as bogie 16, are equidistantly spaced from the bogie pivot. However, it is to be understood that the spacing may be unequal and preferably with a greater distance between the pivot and a wheel such as 14e than the distance between the pivot and a wheel such as 13e. This provides a much larger amplitude of motion of a wheel such as 14e to enable it to surmount obstacles.

In various of the above embodiments it was shown that the bogies were always inclined at equal angles to the horizontal in all pivotal positions thereof. However, in certain embodiments wherein limited travel differential or torsion bars or spring-shock suspensions are used, the bogies need not always be inclined at the same angle because the foregoing structures compensate for the above-described scuffing. Furthermore, as briefly noted above, if desired, the wheels on the various bogies need not be equidistantly spaced from the bogie pivots.

In FIGS. 18–20 a further modified embodiment of the present invention is disclosed in which independently spring-shock mounted bogie wheels have structure which positively drives them and/or steers them. More specifically, vehicle body 11f includes a bogie 19f, which corresponds to bogie 19e of the preceding figures, and which is pivotally mounted at 150. The wheel 12f is effectively mounted between vehicle body 11f and bogie 19f by a spring-shock suspension, and wheel 12f can be both positively driven and steered. More specifically, lower link 151 has a pair of spaced ears at one end thereof pivotally mounted by a pair of pins 152 on the ends 154 of bracket 153 which is secured to the vehicle body 11f. Lower link 151 is identical to upper link 162 which will be described hereafter and which can be viewed in plan in FIG. 19. The opposite end 55 of link 151 has spaced portions 157 which support pin 159. Sleeve 160 of ring 161 is pivotally mounted on the central portion of pin 159.

The spring-shock suspension also includes an upper link 162 having ear portions 143 which receive pins 164 which are journalled in brackets 165 secured to the vehicle body 11f. The opposite end 167 of link 162 has spaced portions 168 which pivotally mount the opposite ends of pin 169, the central portion of which is pivotally received in sleeve 170 formed integrally with the upper portion of ring 161. By virtue of the foregoing pivotal mounting of links 151 and 162 relative to the vehicle body 11f and relative to ring 161, a generally parallelogram-type of linkage is provided wherein identical links 151 and 162 can pivot in the same direction in unison.

Wheel 12f is mounted relative to links 151 and 162 in the following manner. A tubular sleeve 172 has diametrically opposed pins 173 extending outwardly therefrom which are pivotally received in bosses 174 formed integrally with ring 161. The axes of pins 173 are coaxial and extend in a direction which is substantially perpendicular to the axes of pins 159 and 169. Thus as ring 161 travels in substantially vertical up and down directions in response to counterclockwise and clockwise pivotal directions, respectively, of links 162 and 151, sleeve 172 will move in a substantially vertical direction up and down, respectively, with ring 161 by virtue of the connection between pins 173 and bosses 174. However, because of the pivotal connection provided by pins 173 relative to bosses 174, sleeve 172 can pivot about the axes of pins 173, that is, into and out of the plane of the drawings in FIG. 20, or in the direction of arrows 175 of FIG. 19. In order to effect such pivotal movement of sleeve 172 to cause wheel 12f to pivot in the direction of arrows 175, a steering link 177 is provided which has its end pivotally mounted to link 179 at 180. The opposite end of link 179 is rigidly secured to sleeve 172. Thus, by moving link 177 back and forth, wheel 12f can be pivoted in the direction of arrows 175.

In addition to providing a linkage for steering wheel 12f in the foregoing manner, structure is also provided for positively driving wheel 12f. In this respect, a drive shaft 180' has one end coupled to a suitable power source (not shown) for rotating it. The end of shaft 180' is secured to universal 181 which in turn is coupled to one end of shaft 182, the other end of which is coupled to universal 183, the output of which is coupled to shaft 184 keyed to sleeve 185 journalled at 189 in sleeve 172. Wheel 12f is fixedly secured to disc 190 keyed to sleeve 185. Thus, a positive drive is transmitted to wheel 12f, which is also steerable.

As described above relative to FIGS. 14–17, the wheel suspension also includes a spring-shock type of arrangement. In this respect, a shock absorber 171' has a housing to which bracket 173' is rigidly secured and which supports the lower end of spring 174', the upper end of which bears against bracket 175' rigidly secured to piston rod 177'. The upper end of piston rod 177' has a ball connection 179' associated with bogie 19f which is pivotally mounted in standard 180" which corresponds to the standards 117" and 119" of FIG. 14. The shock absorber housing has an extension 181' which terminates at a ball 182' which is pivotally received on link 151. Bracket 173' is positioned in an opening 176' in link 162. Thus, as wheel 12f travels up and down, the spring-shock construction will absorb the loading and transmit motion between link 151 and bogie 19f, and in addition, as noted above, wheel 12f has structure associated therewith which both drives it and steers it.

While the steering linkage and drive linkage has been shown in FIGS. 18–20 as associated with only one wheel, it will be appreciated that each of the wheels of the double bogie construction shown in embodiments such as FIGS. 13–20 can have both a drive structure and a steering structure associated therewith. Also, if desired only select wheels can have both the drive structure and steering structure associated therewith while other of the wheels can have only a drive structure associated therewith. Also, under certain circumstances it may be desirable to only have certain wheels driven and other wheels only steerable, and such structure is also within the contemplation of wheels having a double bogie construction of the type described above. In other words, there can be any combination of driven and steerable wheels associated with a double bogie construction in view of the type of structure disclosed above relative to FIGS. 18–20. It will be appreciated that with structures such as shown in FIGS. 18–20, the outer wheels of double bogie constructions on opposite ends of the vehicle can be turned in different directions so as to provide a short radius of turning of the entire vehicle.

While preferred embodiments of the present invention have been disclosed, it will be appreciated that it is not limited thereto but may be otherwise embodied within the scope of the following claims.

What is claimed is:

1. A vehicle comprising a vehicle body, a plurality of wheels, means mounting said wheels for rotation on said body, drive means on said body for driving said wheels, and limited travel differential gear means between said wheels for permitting only limited relative rotation of said wheels on said opposite sides of said differential gear means and thereafter automatically temporarily locking said wheels on opposite sides of said differential gear means to each other to terminate said relative rotation and cause said wheels to rotate without said relative rotation therebetween.

2. A vehicle comprising a vehicle body, a plurality of wheels, means mounting said wheels for rotation on said body, drive means on said body for driving said wheels, and limited travel differential means between said wheels for limiting relative rotation of said wheels on opposite sides of said differential means, said limited travel differential means comprising first shaft means, a block keyed to said first shaft means, first bevel gear means journalled on said first shaft means on opposite sides of said block and coaxial with said first shaft means, second shaft means on said block and extending substantially perpendicularly to said first shaft means, second bevel gear means journalled on said second shaft means and in engagement with said first bevel gear means, and key means on said block for locking engagement with said first gear means after a predetermined limited amount of relative rotation therebetween to thereby terminate said relative rotation.

3. A vehicle as set forth in claim 2 wherein said first gear means include slots in the outer peripheries thereof, and wherein said key means extends into said slots, and wherein said slots are wider than said key means to effect said predetermined amount of limited relative rotation of each of said first gear means.

4. A limited travel differential comprising first shaft means, a central block fixed to said first shaft means, first bevel gear means journalled on said first shaft means on opposite sides of said central block, second shaft means on said block and extending substantially perpendicularly to said first shaft means, second bevel gear means journalled on said second shaft means and in driving engagement with said first bevel gear means, and key means on said block for locking engagement with said first gear means to limit relative rotation of said first bevel gear means.

5. A limited travel differential as set forth in claim 10 wherein said first gear means include slot means in the outer peripheries thereof, and wherein said key means extends into said slot means, and wherein said slot means are wider than said key means to effect said limited relative rotation of said first gear means.

6. In a vehicle body having a power source, a wheel suspension comprising a bogie having a central portion and spaced portions on opposite sides of said central portion, pivot means having a first axis for pivotally mounting said central portion of said bogie on said vehicle body, first and second wheels, first and second parallel shafts mounted on said bogie on opposite sides of said central portion mounting said first and second wheels, respectively, first and second means on said bogie for driving said first and second wheels, respectively, and limited travel differential gear means located between said power source and said first and second means for permitting limited relative rotational movement between said first and second wheels and thereafter automatically temporarily locking said first and second wheels to each other to terminate said relative rotation between said first and second wheels and to cause said first and second wheels to rotate without said relative rotation therebetween.

7. In a vehicle body as set forth in claim 6 wherein said bogie has inner and outer ends, a second bogie having inner and outer ends, second pivot means mounting said second bogie on said vehicle body, connecting means connecting said bogie and said second bogie at said inner ends thereof, a third wheel mounted on said second bogie on the opposite side of said second pivot means from said connecting means, and third means on said second bogie for driving said third wheel.

8. In a vehicle body as set forth in claim 7 wherein said first and third wheels are mounted on said outer ends of said bogie and second bogie, respectively, and wherein said second wheel and said third wheel travel in the same direction laterally of said body as said bogie and second bogie pivot, and wherein said first wheel travels in the opposite direction laterally of said body as said bogie and second bogie pivot, and wherein said limited travel differential gear means is effectively located between said first wheel, on one hand, and said second and third wheels, on the other hand.

9. A vehicle comprising a vehicle body having opposite sides, first and second bogies on each of said opposite sides, first and second axles on each of said opposite sides mounting central portions of each of said first and second bogies, respectively, for pivotal movement, each of said first and second bogies having inner and outer ends, means mounting an outer wheel for rotation on each outer end of each of said first and second bogies, means mounting an inner wheel on the inner end of each of said second bogies, first driving means for positively driving all of said inner and outer wheels on one of said sides of said vehicle comprising first drive linkage means coupled to said outer wheel on said first bogie, second drive linkage means coupled to said inner wheel on said second bogie, and third drive linkage means coupled to said outer wheel on said second bogie, and limited travel differential gear means effectively interposed between said third drive linkage means, on one hand, and said first and second drive linkage means, on the other hand, so that there can be only limited relative rotational movement between said outer wheel on said second bogie, on one hand, and said outer wheel on said first bogie and said inner wheel on said second bogie, on the other hand, and second driving means corresponding to said first driving means for driving all of said inner and outer wheels on the other side of said vehicle.

* * * * *

UNITED STATES PATENT AND TRADEMARK OFFICE
CERTIFICATE OF CORRECTION

PATENT NO. : 4,969,530

DATED : November 13, 1990

INVENTOR(S) : John F. Kopczynski

It is certified that error appears in the above-identified patent and that said Letters Patent is hereby corrected as shown below:

Column 12, line 65 (claim 1), delete "said" (second occurrence).

Column 13, line 38 (claim 5), change "10" to --4--.

Signed and Sealed this

Third Day of March, 1992

Attest:

HARRY F. MANBECK, JR.

*Attesting Officer*     *Commissioner of Patents and Trademarks*